US 12,512,267 B2
Han et al.
Dec. 30, 2025

(54) MULTILAYERED CAPACITOR

(71) Applicant: SAMSUNG ELECTRO-MECHANICS CO., LTD., Suwon-si (KR)

(72) Inventors: Jihye Han, Suwon-si (KR); Hong Je Choi, Suwon-si (KR); Byungwoo Kang, Suwon-si (KR); Hyejin Park, Suwon-si (KR); Suyun Yun, Suwon-si (KR); Sangwook Lee, Suwon-si (KR); Jungmin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 113 days.

(21) Appl. No.: 18/516,725

(22) Filed: Nov. 21, 2023

(65) Prior Publication Data

US 2024/0222027 A1    Jul. 4, 2024

(30) Foreign Application Priority Data

Jan. 2, 2023   (KR) .................. 10-2023-0000157
Mar. 6, 2023   (KR) .................. 10-2023-0029330

(51) Int. Cl.
| | |
|---|---|
| *H01G 4/232* | (2006.01) |
| *H01G 4/248* | (2006.01) |
| *H01G 4/252* | (2006.01) |
| *H01G 4/30* | (2006.01) |

(52) U.S. Cl.
CPC .......... *H01G 4/2325* (2013.01); *H01G 4/248* (2013.01); *H01G 4/252* (2013.01); *H01G 4/30* (2013.01)

(58) Field of Classification Search
CPC ...... H01G 4/2325; H01G 4/248; H01G 4/252; H01G 4/30
See application file for complete search history.

(56) References Cited

U.S. PATENT DOCUMENTS

| | | |
|---|---|---|
| 2014/0043724 A1 | 2/2014 | Kang et al. |
| 2015/0114700 A1 | 4/2015 | Park et al. |
| 2019/0066923 A1* | 2/2019 | Jung ............... H01G 4/008 |

(Continued)

FOREIGN PATENT DOCUMENTS

| | | | |
|---|---|---|---|
| JP | 2021141306 A | * 9/2021 | ......... H01F 27/2804 |
| KR | 10-2014-0021416 A | 2/2014 | |

(Continued)

OTHER PUBLICATIONS

The Extended European Search Report dated Jul. 24, 2024 issued in European Patent Application No. 23217578.6.

*Primary Examiner* — Michael P Mcfadden
(74) *Attorney, Agent, or Firm* — Morgan Lewis & Bockius LLP

(57) ABSTRACT

Disclosed is a multilayered capacitor that includes a capacitor body including a dielectric layer and an internal electrode, and an external electrode outside the capacitor body, wherein the external electrode includes a first layer connected to the internal electrode, a second layer covering a portion of the first layer and exposing another portion, a third layer covering the second layer and including a resin and a conductive metal, and a fourth layer covering the first and third layers, and an area ratio of the resin included in the second layer is greater than an area ratio of the resin included in the third layer.

24 Claims, 8 Drawing Sheets

(56) References Cited

U.S. PATENT DOCUMENTS

| | | |
|---|---|---|
| 2019/0131070 A1 | 5/2019 | Onodera et al. |
| 2019/0131076 A1* | 5/2019 | Fukumura ............... H01G 4/232 |
| 2019/0385795 A1* | 12/2019 | Yang ........................ H01G 4/30 |
| 2020/0058443 A1* | 2/2020 | Kang ........................ H01G 4/30 |
| 2020/0273621 A1* | 8/2020 | Yi ............................ H01G 4/248 |
| 2020/0343044 A1* | 10/2020 | Bae ........................... H01G 4/12 |
| 2020/0402715 A1 | 12/2020 | Yoon et al. |
| 2021/0065980 A1* | 3/2021 | Jung ........................ H01G 4/005 |
| 2021/0074481 A1* | 3/2021 | Yi ............................ H01G 4/30 |
| 2021/0098193 A1* | 4/2021 | Mishima ................. H01G 2/065 |
| 2021/0125783 A1 | 4/2021 | Onodera et al. |
| 2022/0037087 A1* | 2/2022 | Yi ............................ H01G 4/232 |
| 2022/0301777 A1 | 9/2022 | Nishimura |
| 2022/0301779 A1 | 9/2022 | Take |

FOREIGN PATENT DOCUMENTS

| | | | |
|---|---|---|---|
| KR | 20190004631 A | * | 1/2019 |
| KR | 10-2019-0055187 A | | 5/2019 |

\* cited by examiner

MULTILAYERED CAPACITOR

CROSS-REFERENCE TO RELATED APPLICATIONS

This application claims priority to and the benefit of Korean Patent Application No. 10-2023-0029330 filed in the Korean Intellectual Property Office on Mar. 6, 2023, and Korean Patent Application No. 10-2023-0000157 filed in the Korean Intellectual Property Office on Jan. 2, 2023, the entire contents of which are incorporated herein by reference.

TECHNICAL FIELD

This disclosure relates to a multilayered capacitor.

Demand for multilayered capacitors (MLCC) with improved performance and strong reliability is increasingly according to technological developments in the automotive electrical device industry and the IT industry. In particular, since the automotive electrical device industry requires the strong reliability in a mechanical stress environment, demand for multilayered capacitors with bending strength characteristics at a predetermined level is increasing.

The multilayered capacitors use external electrodes sintered after mixing metal powder and a binder. The sintered external electrodes have an advantage of excellent electrical connectivity with internal electrodes but are vulnerable to mechanical stress due to low ductility.

Accordingly, in order to improve the mechanical reliability of the multilayered capacitors, resin-based external electrodes manufactured by mixing a polymer resin and metal powder is applied to the outside of the sintered external electrodes. The resin-based external electrodes have higher ductility than the sintered external electrodes and thus improve the mechanical characteristics of the multilayered capacitors but have a problem of deteriorating the electrical connectivity than the sintered external electrodes.

The electrical characteristics of the resin-based external electrodes may be improved by adjusting a metal content in the resin. However, when the metal content in the resin-based external electrodes is increased, the ductility effect by the resin is deteriorated, resulting in deteriorating the bending strength. Accordingly, the metal content of the resin-based external electrodes is limited not to deteriorate the bending strength. However, as the multilayered capacitors are more widely applied in the automotive electric parts industry and thus required of stronger reliability, characteristics of the resin-based external electrodes need to be improved.

SUMMARY

One aspect of the present disclosure provides a multilayered capacitor in which a bending strength is improved due to increase of ductility of the external electrode, so that stress relief is easy when the board is warped, an adhesive force between the sintered metal layer and the conductive resin layer of the external electrode is increased to improve a bonding strength of the external electrode, the plating layer of the external electrode is densely formed to improve moisture resistance reliability, and the sintered metal layer and the plating layer are directly connected to improve electrical characteristics.

A multilayered capacitor according to some embodiments of the present disclosure includes a capacitor body including a dielectric layer and an internal electrode, and an external electrode disposed on an outside surface of the capacitor body, wherein the external electrode includes a first layer disposed on the outside surface of the capacitor body and connected to the internal electrode, a second layer including resin and covering a portion of the first layer and exposing another portion of the first layer, a third layer covering the second layer and including a resin and a conductive metal, and a fourth layer covering the first and third layers.

The capacitor body has first and second surfaces facing each other in a stacking direction of the dielectric layer and the internal electrodes, third and fourth surfaces facing each other in a longitudinal direction, and fifth and sixth surfaces facing each other in a width direction.

In some embodiments, in a cross-section cut in the longitudinal and thickness directions perpendicular to a width direction at a center in the width direction, an area ratio of the resin included in the second layer may be greater than an area ratio of the resin included in the third layer.

In some embodiments, the second layer may not be disposed on the second surface. The third layer may not be disposed on the second surface. In some embodiments, the first layer may be disposed on the first, second, and third surfaces. In some embodiments, the second layer may be disposed on the first and third surfaces. In some embodiments, the third layer may be disposed on the first and third surfaces. In some embodiments, the fourth layer may be disposed on the first, second, and third surfaces. In some embodiments, the first to fourth layers may be disposed on the fifth and sixth surfaces.

In some embodiments, in a cross section cut in the longitudinal direction and the stacking direction perpendicular to the width direction at the center of the width direction of the multilayered capacitor, on the third or fourth surface, a length of the second layer in the stacking direction may be less than or equal to a length of the first layer in the stacking direction.

In some embodiments, in a cross-section cut in the longitudinal and thickness directions perpendicular to a width direction at a center in the width direction of the multilayered capacitor, on the third or fourth surface, a length of the third layer in the stacking direction on the third or fourth surface may be less than or equal to a length of the first layer in the stacking direction.

In some embodiments, in a cross-section cut in the longitudinal and thickness directions perpendicular to a width direction at a center in the width direction of the multilayered capacitor, on the third or fourth surface, a length of the second layer in the stacking direction may be about 95% or less, 90% or less, 85% or less, 80% or less, 75% or less, 70% or less, 65% or less, 60% or less, 55% or less, or 50% or less relative to a length of the first layer in the stacking direction.

In some embodiments, in a cross-section cut in the longitudinal and thickness directions perpendicular to a width direction at a center in the width direction of the multilayered capacitor, on the third or fourth surface, a length of the third layer in the stacking direction may be about 95% or less, 90% or less, 85% or less, 80% or less, 75% or less, 70% or less, 65% or less, 60% or less, 55% or less, or 50% or less relative to a length of the first layer in the stacking direction.

In some embodiments, in a cross-section cut in the longitudinal and thickness directions perpendicular to a width direction at a center in the width direction of the multilayered capacitor, on the third or fourth surface, a length of the third layer in the stacking direction may be greater than or equal to a length of the second layer in the stacking direction.

In some embodiments, in a cross-section cut in the longitudinal and thickness directions perpendicular to a width direction at a center in the width direction of the multilayered capacitor, the second layer may be disposed to completely cover the first layer on the first surface.

In some embodiments, in a cross-section cut in the longitudinal and thickness directions perpendicular to a width direction at a center in the width direction of the multilayered capacitor, the third layer may be disposed to completely cover the first layer on the first surface.

In some embodiments, on the first surface, the third layer may be disposed to completely cover the second layer, or on the first surface, the third layer may be disposed to partially expose the second layer without covering it completely.

In some embodiments, on the first surface, the second layer may be disposed to completely cover the first layer.

In some embodiments, on the first surface, the third layer may be disposed so as to partially expose the second layer without covering it completely.

In some embodiments, on the first surface, the fourth layer may be disposed so as to partially expose the second layer without covering it completely.

In some embodiments, the second layer may further include a non-conductive filler. The non-conductive filler may include silica, glass-based oxide, or a combination thereof.

In some embodiments, in a cross-section cut in the longitudinal and thickness directions perpendicular to a width direction at a center in the width direction of the multilayered capacitor, an area ratio of the resin included in the second layer may be about 100% to about 60% with respect to a total area of the second layer. In some embodiments, the area ratio of the resin included in the second layer may be about 95% or less, about 90% or less, about 80% or less, about 85% or less, about 70% or less, or about 65% or less. In some embodiments, the area ratio of the resin included in the second layer may be about 65% or more, about 70% or more, about 75% or more, about 80% or more, about 85% or more, about 90% or more, or about 95% or more.

In a cross-section cut in the longitudinal and thickness directions perpendicular to a width direction at a center in the width direction of the multilayered capacitor, an area ratio of the resin included in the third layer may be about 60% to about 8% with respect to a total area of the second layer. In some embodiments, the area ratio of the resin included in the third layer may be about 55% or less, about 50% or less, about 45% or less, about 40% or less, about 35% or less, about 30% or less, about 25% or less, about 20% or less, about 15% or less, or about 10% or less. In some embodiments, the area ratio of the resin included in the third layer may be about 10% or more, about 15% or more, about 20% or more, about 25% or more, about 30% or more, about 35% or more, about 40% or more, about 45% or more, about 50% or more, or about 55% or more.

In some embodiments, the second layer may or may not further include a conductive metal.

In some embodiments, in a cross-section cut in the longitudinal and thickness directions perpendicular to a width direction at a center in the width direction of the multilayered capacitor, an area ratio of the conductive metal included in the second layer may be smaller than an area ratio of the resin included in the second layer.

In some embodiments, in a cross-section cut in the longitudinal and thickness directions perpendicular to a width direction at a center in the width direction of the multilayered capacitor, an area ratio of the conductive metal included in the third layer may be greater than an area ratio of the resin included in the third layer.

In some embodiments, in a cross-section cut in the longitudinal and thickness directions perpendicular to a width direction at a center in the width direction of the multilayered capacitor, on the third or fourth surface, a maximum length of the second layer in the longitudinal direction may be greater than or equal to about 3 μm. In some embodiments, a maximum length of the second layer in the longitudinal direction may be about 2.8 μm or less, about 2.6 μm or less, about 2.4 μm or less, about 2.2 μm or less, about 2.0 μm or less.

A method of manufacturing a multilayered capacitor according to some embodiments includes manufacturing a capacitor body including a dielectric layer and an internal electrode, and forming an external electrode outside the capacitor body, wherein the forming of the external electrode includes forming a first layer outside surface of the capacitor body, coating a paste for forming a second layer including a resin to cover a portion of the first layer and expose another portion of the first layer to form the second layer, coating a paste for forming a third layer including a resin and a conductive metal so as to cover the second layer to form the third layer, and forming a fourth layer covering the first and third layers.

In some embodiments, a content of the resin included in the paste for forming the second layer may be greater than a content of the resin included in the paste for forming the third layer.

In some embodiments, in the paste for forming the second layer, a content of the resin relative to a total volume of the resin and the conductive metal may be about 100 vol % to about 160 vol %.

In some embodiments, in the paste for forming the third layer, a content of the resin relative to a total volume of the resin and the conductive metal may be about 60 vol % to about 8 vol %.

In some embodiments, in the paste for forming the second layer, vol % of the conductive metal relative to a total volume of the resin and the conductive metal may be smaller than vol % of the resin.

In some embodiments, in the paste for forming the third layer, vol % of the conductive metal relative to a total volume of the resin and the conductive metal may be greater than vol % of the resin.

According to the multilayered capacitor according to one aspect, a bending strength is improved due to increase of ductility of the external electrode, so that stress relief is easy when the board is warped, an adhesive force between the sintered metal layer and the conductive resin layer of the external electrode is increased to improve a bonding strength of the external electrode, the plating layer of the external electrode is densely formed to improve moisture resistance reliability, and the sintered metal layer and the plating layer are directly connected to improve electrical characteristics.

DETAILED DESCRIPTION OF THE EMBODIMENTS

Figure 1:
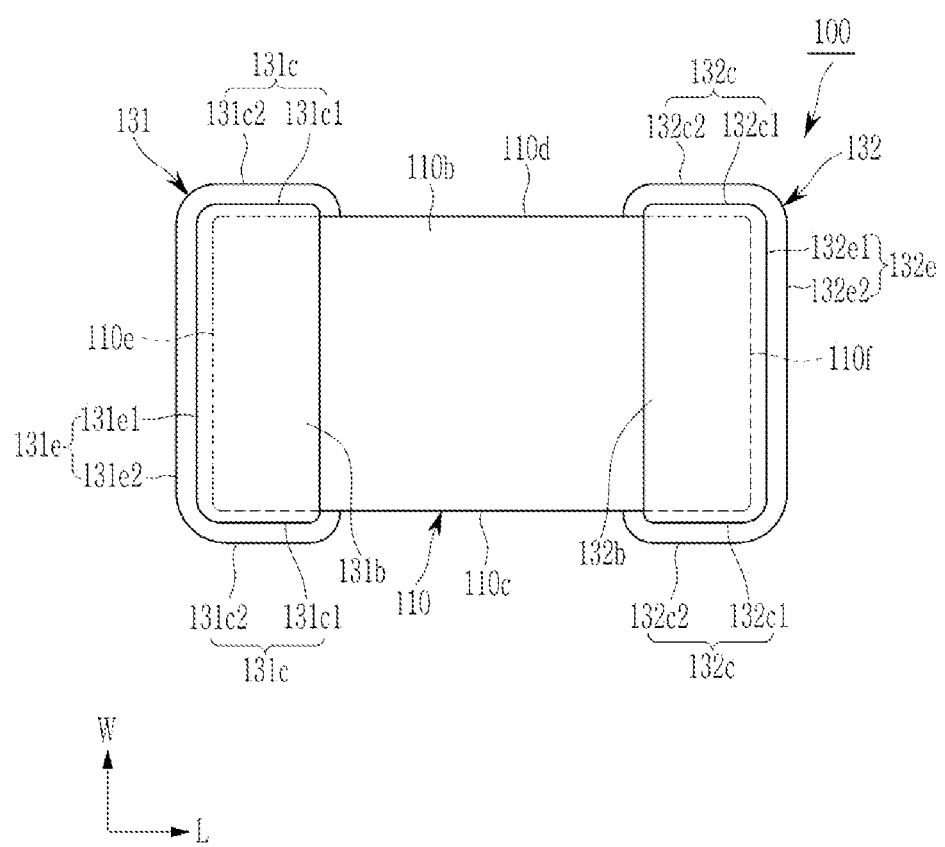
FIG. 1 is a plan view of a multilayered capacitor according to one aspect.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

The term "about," as used herein, means approximately. In general, the term "about" is used herein to modify a numerical value above and below the stated value by a variance of 10%. In one aspect, the term "about" means plus or minus 20% of the numerical value of the number with which it is being used.

Figure 2:
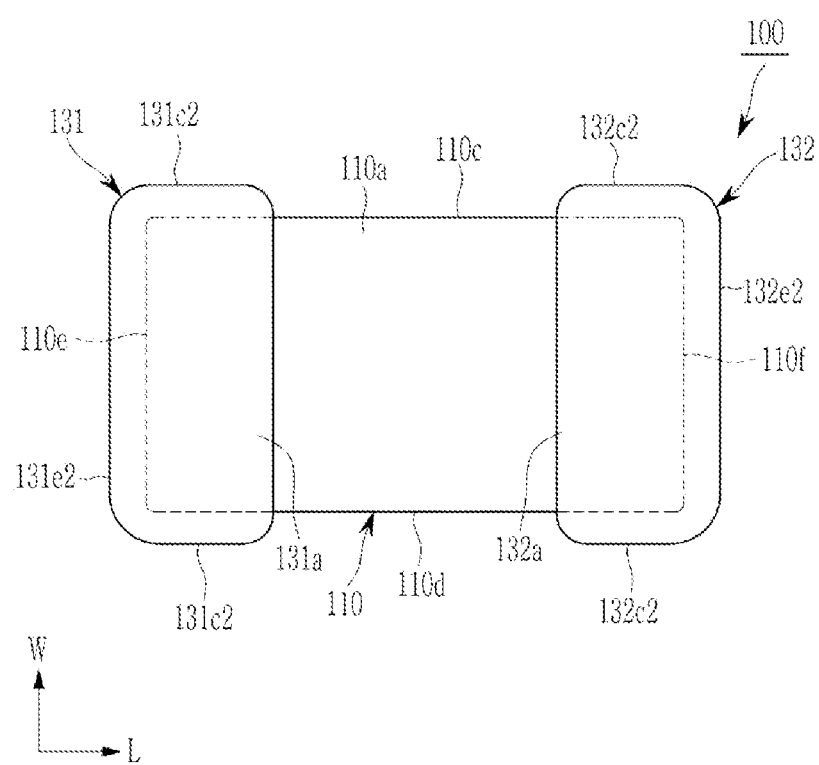
FIG. 2 is another plan view of a multilayered capacitor according to one aspect.
Figure 3:
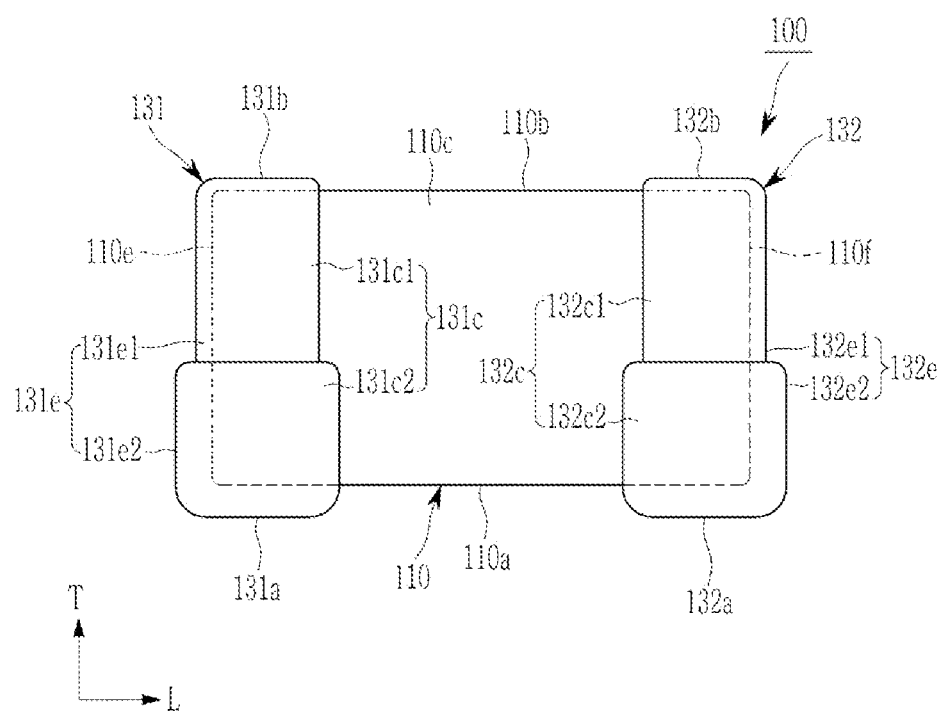
FIG. 3 is a side view of a multilayered capacitor according to one aspect.
Figure 4:
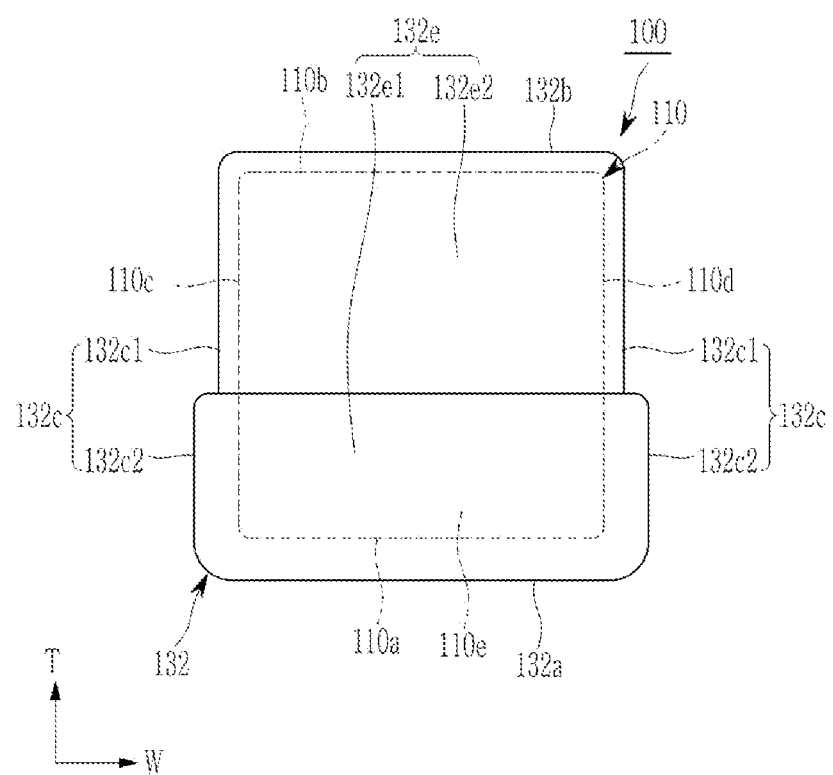
FIG. 4 is another side view of a multilayered capacitor according to one aspect.
Figure 5:
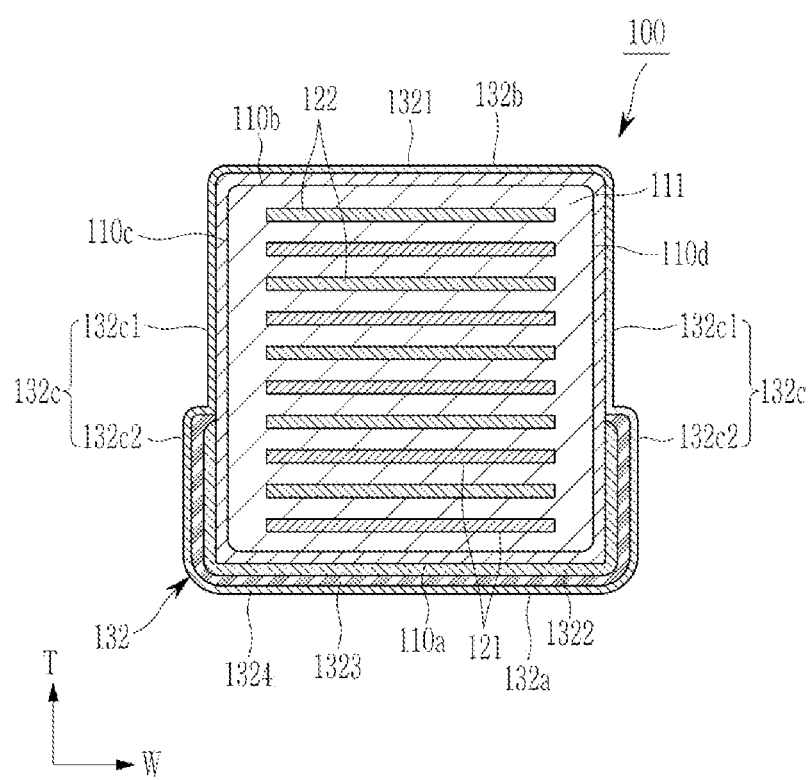
FIG. 5 is a cross-sectional view of a multilayered capacitor according to an aspect.
Figure 6:
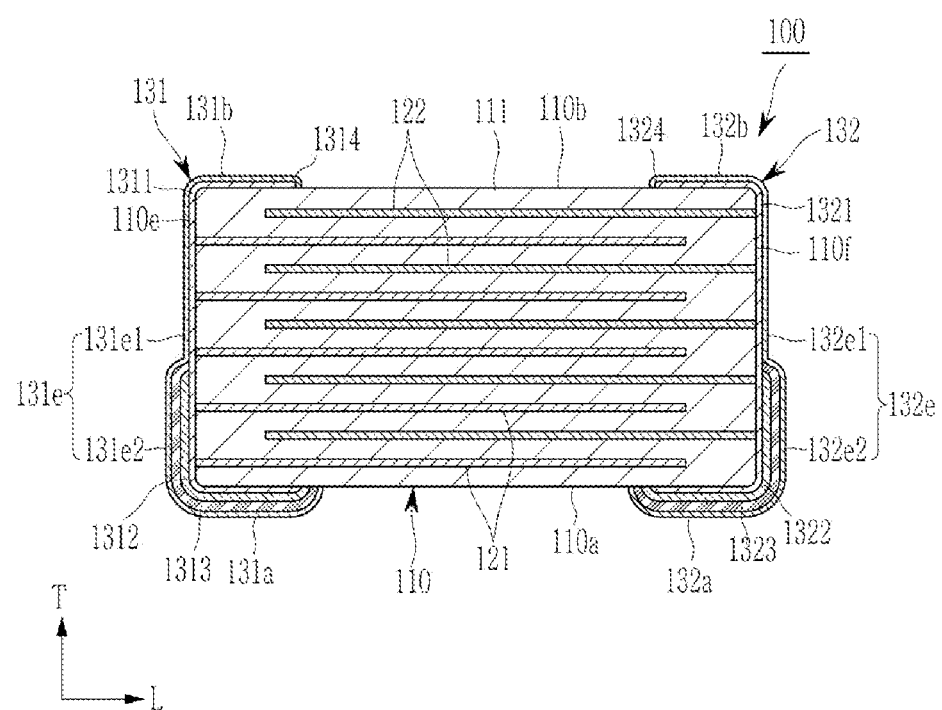
FIG. 6 is another cross-sectional view of a multilayered capacitor according to one aspect.

FIG. 1 is a plan view of a multilayered capacitor according to some embodiments, FIG. 2 is another plan view of a multilayered capacitor according to some embodiments, FIG. 3 is a side view of a multilayered capacitor according to some embodiments, FIG. 4 is another side view of a multilayered capacitor according to some embodiments, FIG. 5 is a cross-sectional view of a multilayered capacitor according to some embodiments, and FIG. 6 is another cross-sectional view of a multilayered capacitor according to some embodiments.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 6, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first surface 110*a* and second surface 110*b*, surfaces connected to the first and second surfaces 110*a* and 110*b* and facing each other in the longitudinal direction (L-axis direction) are defined as third surface 110*e* and fourth surface 110*f*, and surfaces connected to the first and second surfaces 110*a* and 110*b*, connected to the third and fourth surfaces 110*e* and 110*f*, and facing each other in the width direction (W-axis direction) are defined as fifth surface 110*c* and sixth surface 110*d*.

For example, the first surface 110*a*, which is a lower surface, may be a surface facing a mounting direction. In addition, the first to sixth surfaces 110*a*, 110*b*, 110*e*, 110*f*, 110*c*, and 110*d* may be flat, but are not limited thereto, and for example, the first to sixth surfaces 110*a*, 110*b*, 110*e*, 110*f*, 110*c*, and 110*d* may be curved surfaces with a convex central portion, and a corner of each surface which is a boundary, may be round.

The shapes and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. For example, the first and second internal electrodes 121 and 122 may have different polarities.

Herein, the boundary between the respective dielectric layers 111 adjacent to each other of the capacitor body 110 may be integrated to the extent that it is difficult to identify the boundary without using a scanning electron microscope (SEM).

Also, the capacitor body 110 may include an active region and cover regions.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions may be respectively disposed on the first and the second surfaces 110a and 110b of the active region in the thickness direction (T-axis direction) as margin portions. The cover regions may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces 110c and 110d of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$, and the like. In addition, auxiliary components such as a Mn compound, a Fe compound, a Cr compound, a Co compound, and a Ni compound may be further included in addition to the dielectric ceramic containing components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, a transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces 110e and 110f of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces 110e and 110f of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first external electrode 131 may have first to fourth electrode portions 131a, 131b, 131c, and 131e, and the second external electrode 132 may have first to fourth electrode portions 132a, 132b, 132c, and 132e. The first electrode portions 131a and 132a are disposed on the first surface 110a. The second electrode portions 131b and 132b are disposed on the second surface 110b. Each of the third electrode portions 131c and 132c is disposed on both the fifth and sixth surfaces 110c and 110d. The fourth electrode portion 131e is disposed on the third surface 110e, and the fourth electrode portion 132e is disposed on the fourth surface 110f. In other words, the first and second external electrodes 131 and 132 respectively are disposed on five surfaces of the first and second surfaces 110a and 110b, the fifth and sixth surfaces 110c and 110d, and the third or fourth surface 110e or 110f. The first to fourth electrode portions 131a, 132a, 131b, 132b, 131c, 132c, 131e, and 132e neighboring each other are connected at an edge of the capacitor body 110 and electrically connected each other.

The fourth electrode portions 131e and 132e cover each one end of the first and second internal electrodes 121 and 122, which is exposed to the third and fourth surfaces 110e and 110f, respectively. The first and second internal electrodes 121 and 122 are directly connected to the fourth electrode portions 131e and 132e, respectively, and the first and second internal electrodes 121 and 122 are respectively electrically connected to the first and second external electrodes 131 and 132.

The first and second external electrodes 131 and 132 respectively have first layers 1311 and 1321, second layers 1312 and 1322, third layers 1313 and 1323, and fourth layers 1314 and 1324. The fourth layers 1314 and 1324 constitute outermost layers of the first and second external electrodes 131 and 132, respectively.

The first electrode portions 131a and 132a have the first layers 1311 and 1321, the second layers 1312 and 1322, the third layers 1313 and 1323, and the fourth layers 1314 and 1324, respectively. In other words, each of the first electrode portions 131a and 132a has a 4-layer structure. In the first electrode portions 131a and 132a, the first layers 1311 and 1321 may be entirely covered with the second layers 1312 and 1322.

The second electrode portions 131b and 132b have the first layers 1311 and 1321 and the fourth layers 1314 and 1324, respectively, but neither the second layers 1312 and 1322 nor the third layers 1313 and 1323, respectively. In other words, each of the second electrode portions 131b and 132b has a 2-layer structure.

The third electrode portions 131c and 132c have first regions 131c1 and 132c1 and second regions 131c2 and 132c2, respectively. The second regions 131c2 and 132c2 are located closer to the first surface 110a than the first regions 131c1 and 132c1. The first regions 131c1 and 132c1 have the first layers 1311 and 1321 and the fourth layers 1314 and 1324, respectively, but neither the second layers 1312 and 1322 nor the third layers 1313 and 1323, respectively. In other words, each of the first regions 131c1 and 132c1 has a 2-layer structure. The second regions 131c2 and 132c2 have the first layers 1311 and 1321, the second layer 1312 and 1322, the third layers 1313 and 1323, and the fourth layers 1314 and 1324, respectively. In other words, each of the second regions 131c2 and 132c2 has a 4-layer structure.

The fourth electrode portions 131e and 132e have first regions 131e1 and 132e1 and second regions 131e2 and 132e2, respectively. The second regions 131e2 and 132e2 are closer to the first surface 110a than the first regions 131e1 and 132e1. The first regions 131e1 and 132e1 have the first layers 1311 and 1321 and the fourth layers 1314 and 1324, respectively, but neither the second layers 1312 and 1322 nor the third layers 1313 and 1323, respectively. In other words, each of the first regions 131e1 and 132e1 has a 2-layer structure. The second regions 131e2 and 132e2 have the first layers 1311 and 1321, the second layers 1312 and 1322, the third layers 1313 and 1323, and the fourth layers 1314 and 1324, respectively. In other words, each of the second regions 131e2 and 132e2 has a 4-layer structure.

The first layers 1311 and 1321 are in direct contact with the capacitor body 110 and disposed respectively on the third and fourth surfaces 110e and 110f of the capacitor body 110 to be connected to the first and second internal electrodes 121 and 122, respectively. The first layers 1311 and 1321 are located in the first electrode portions 131a and 132a, the second electrode portions 131b and 132b, the first regions 131c1 and 132c1 and the second regions 131c2 and 132c2 of the third electrode portions 131c and 132c, and the first regions 131e1 and 132e1 and the second regions 131e2 and 132e2 of the fourth electrode portions 131e and 132e, respectively. In other words, the first layer 1311 may be disposed on the first surface 110a, the second surface 110b, the third surface 110e, the fifth surface 110c, and the sixth surface 110d, and the first layer 1321 may be disposed on the first surface 110a, the second surface 110b, the fourth surface 110f, the fifth surface 110c, and the sixth surface 110d. For example, the first layers 1311 and 1321 may be sintered metal layers.

The second layers 1312 and 1322 are disposed to cover some portions of the first layers 1311 and 1321 but expose the other portions, respectively. The second layers 1312 and 1322 are located in the first electrode portions 131a and 132a, the second regions 131c2 and 132c2 of the third electrode portions 131c and 132c, and the second regions 131e2 and 132e2 of the fourth electrode portions 131e and 132e, respectively. In other words, the second layers 1312 and 1322 may not be disposed on the second surface 110b but disposed on the first surface 110a, the third surface 110e or the fourth surface 110f, the fifth surface 110c, and the sixth surface 110d. For example, the second layers 1312 and 1322 may be conductive resin layers.

The third layers 1313 and 1323 may be disposed to cover all or some portions of the second layers 1312 and 1322, respectively. The third layers 1313 and 1323 are located in the first electrode portions 131a and 132a, the second regions 131c2 and 132c2 of the third electrode portions 131c and 132c, and the second regions 131e2 and 132e2 of the fourth electrode portions 131e and 132e, respectively. In other words, the third layers 1313 and 1323 may not be disposed on the second surface 110b but disposed on the first surface 110a, the third surface 110e or fourth surface 110f, the fifth surface 110c, and the sixth surface 110d. For example, the third layers 1313 and 1323 may be conductive resin layers.

The fourth layers 1314 and 1324 may be disposed to cover the third layers 1313 and 1323 and the entire exposed regions of the first layers 1311 and 1321, respectively. The fourth layers 1314 and 1324 are located in the first electrode portions 131a and 132a, the second electrode portions 131b and 132b, the first regions 131c1 and 132c1 and the second regions 131c2 and 132c2 of the third electrode portions 131c and 132c, and the first regions 131e1 and 132e1 and the second regions 131e2 and 132e2 of the fourth electrode portions 131e and 132e, respectively. In other words, the fourth layers 1314 and 1324 may be located in the first surface 110a, the second surface 110b, the third surface 110e, the fourth surface 110f, the fifth surface 110c, and the sixth surface 110d. For example, the fourth layers 1314 and 1324 may be plating layers.

The first to fourth electrode portions 131a, 131b, 131c, and 131e of the first layer 1311 may be integrally connected, and the first to fourth electrode portions 132a, 132b, 132c, and 132e of the first layer 1321 may be integrally connected. The second layers 1312 and 1322 that the first, third, and fourth electrode portions 131a, 132a, 131c, 132c, 131e, and 132e respectively have may be integrally connected. The third layers 1313 and 1323 that the first, third, and fourth electrode portions 131a, 132a, 131c, 132c, 131e, and 132e respectively have may be integrally connected. The fourth layers 1314 and 1324 that the first to fourth electrode portions 131a, 132a, 131b, 132b, 131c, 132c, 131e, and 132e respectively have may be integrally connected.

Below, each length of the first to fourth layers 1311, 1321, 1312, 1322, 1313, 1323, 1314, and 1324 may be analyzed by examining a cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction) with a scanning electron microscope (SEM) or a scanning transmission electron microscope (STEM), etc. SEM or STEM etc. may be measured at 5000 magnifications. In the cross-section, when the first to fourth layers 1311, 1321, 1312, 1322, 1313, 1323, 1314, and 1324 respectively have a plurality of lengths, the maximum length among them may be each length of the first to fourth layers 1311, 1321, 1312, 1322, 1313, 1323, 1314, and 1324.

In addition, an area ratio of a resin or a conductive metal of the second layers 1312 and 1322 and the third layers 1313 and 1323 and whether a non-conductive filler is included therein or not may be measured by examining the cross-section image taken with SEM or STEM, etc. by using an electron beam microanalyzer (EPMA). When the component analysis is performed with an electron beam microanalyzer (EPMA), an energy dispersive spectroscope (EDS), or a wavelength dispersive spectroscope (WDS), as an X-ray spectrometer may be used. For example, when the cross-section of the first and second external electrodes 131 and 132 are examined with a reflection electron image of SEM or an HAADF image of STEM, etc., a conductive metal with a metallic bond may be recognized as a bright part of contrast, but a non-metal component such as a resin or a non-conductive filler, etc. (including other voids and oxides) may be recognized as a dark part of the contrast. Accordingly, an area of the resin and the conductive metal of the second layers 1312 and 1322 and the third layers 1313 and 1323 may be obtained as an area ratio of the bright part to the entire area of the measurement field of view by binarizing the cross-section photograph.

On the third surface 110e, a stacking direction (T-axis direction) length of the second layers 1312 and 1322 may be less than or equal to that of the first layers 1311 and 1321. For example, on the third surface 110e, the stacking direction (T-axis direction) length of the second layer 1312 may be less than or equal to about 95% or about 10% to about 50% of that of the first layers 1311. For example, on the fourth surface 110f, the stacking direction (T-axis direction) length of the second layer 1322 may be less than or equal to about 95% or about 10% to about 50% of that of the first layers 1321. On the third surface 110e, when the stacking direction (T-axis direction) length of the second layer 1312 is greater than about 95% of that of the first layer 1311, the electrical connectivity may be deteriorated. On the fourth surface 110f, when the stacking direction (T-axis direction) length of the second layer 1322 is greater than about 95% of that of the first layer 1321, the electrical connectivity may be deteriorated.

In addition, on the third surface 110e, the stacking direction (T-axis direction) length of the third layer 1313 may be less than or equal to that of the first layer 1311. On the fourth surface 110f, the stacking direction (T-axis direction) length of the third layer 1323 may be shorter than or equal to that of the first layer 1321. For example, on the third surface 110e, the stacking direction (T-axis direction) length of the third layer 1313 may be less than or equal to about 95% or about 10% to about 50% of that of the first layer 1311. On the fourth surface 110f, the stacking direction (T-axis direction) length of the third layer 1323 may be less than or equal to about 95% or about 10% to about 50% of that of the first layer 1321. On the third surface 110e, when the stacking direction (T-axis direction) length of the third layer 1313 is greater than about 95% of that of the first layer 1311, the electrical connectivity may be deteriorated. On the fourth surface 110f, when the stacking direction (T-axis direction) length of the third layer 1323 is greater than about 95% of that of the first layer 1321, the electrical connectivity may be deteriorated.

Figure 7:
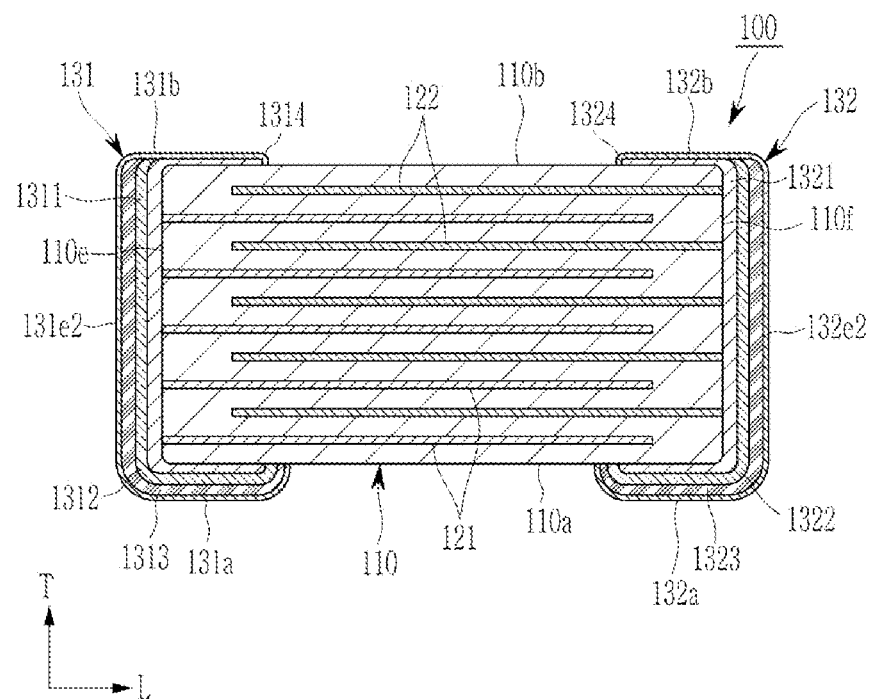
FIG. 7 is a cross-sectional view of a multilayered capacitor according to a modified example of one aspect.

FIG. 7 is a cross-sectional view of a multilayered capacitor 100 according to a modified example of one aspect.

FIG. 6 shows a case that on the third surface 110e, the stacking direction (T-axis direction) length of the second layer 1312 is less than that of the first layer 1311, and on the fourth surface 110f, the stacking direction (T-axis direction) length of the second layer 1322 is shorter than that of the first layer 1321. FIG. 7 shows a case that on the third surface 110e, the stacking direction (T-axis direction) length of the second layer 1312 is equal to that of the first layer 1311, and on the fourth surface 110f, the stacking direction (T-axis direction) length of the second layer 1322 is equal to that of the first layer 1321.

In addition, FIG. 6 shows a case that on the third surface 110e, the stacking direction (T-axis direction) length of the third layer 1313 is shorter than that of the first layers 1311, and on the fourth surface 110e, the stacking direction (T-axis direction) length of the third layer 1323 is shorter than that of the first layers 1321. FIG. 7 shows that on the third surface 110e, the stacking direction (T-axis direction) length of the third layer 1313 is equal to that of the first layer 1311, on the fourth surface 110f, the stacking direction (T-axis direction) length of the third layer 1323 is equal to that of the first layer 1321.

Since the bending strength characteristics are improved by the second layers 1312 and 1322, the second layers 1312 and 1322 may be thicker than the third layers 1313 and 1323. For example, on the third surface 110e or the fourth surface 110f of the second layers 1312 and 1322, respectively, a longitudinal direction (L-axis direction) length may be greater than or equal to about 3 μm or about 5 μm to about 150 μm. In some embodiments, the longitudinal direction (L-axis direction) length of the second layers 1312 and 1322 may about 10 μm or more, about 20 μm or more, about 30 μm or more, about 40 μm or more, about 50 μm or more, about 60 μm or more, about 70 μm or more, about 80 μm or more, about 90 μm or more, about 90 μm or more, or about 100 μm or more. In some embodiments, the longitudinal direction (L-axis direction) length of the second layers 1312 and 1322 may be about 140 μm or less, about 130 μm or less, about 120 μm or less, about 110 μm or less, about 100 μm or less. On the third surface 110e of the second layer 1312, and on the fourth surface of the second layer 1322, the longitudinal direction (L-axis direction) length is less than about 3 μm, the bending strength may be insignificantly improved. Since the third layers 1313 and 1323 is for securing plating properties, which are regardless of a thickness, the third layers 1313 and 1323 may be thick enough, if evenly applied.

On the first surface 110a, a longitudinal direction length of the second layers 1312 and 1322 may be greater than or equal to that of the first layers 1311 and 1321, respectively. Accordingly, on the first surface 110a, the second layers 1312 and 1322 may be disposed on the first surface 110a to completely cover the first layers 1311 and 1321.

On the first surface 110a, a longitudinal direction length of the third layers 1313 and 1323 may be greater than or equal to that of the first layers 1311 and 1321, respectively. Accordingly, on the first surface 110a, the third layers 1313 and 1323 may be disposed to completely cover the first layers 1311 and 1321, respectively.

On the other hand, on the first surface 110a, the longitudinal direction length of the third layers 1313 and 1323 may be greater than or equal to that of the second layers 1312 and 1322, respectively. Accordingly, on the first surface 110a, the third layers 1313 and 1323 may be disposed to completely cover the second layers 1312 and 1322, respectively.

Or, the longitudinal direction length of the second layers 1312 and 1322 may be greater than or equal to that of the third layers 1313 and 1323, respectively. Accordingly, on the first surface 110a, the third layers 1313 and 1323 may be disposed not to completely cover the second layers 1312 and 1322 but to expose some portions of the second layers 1312 and 1322, respectively.

Figure 8:
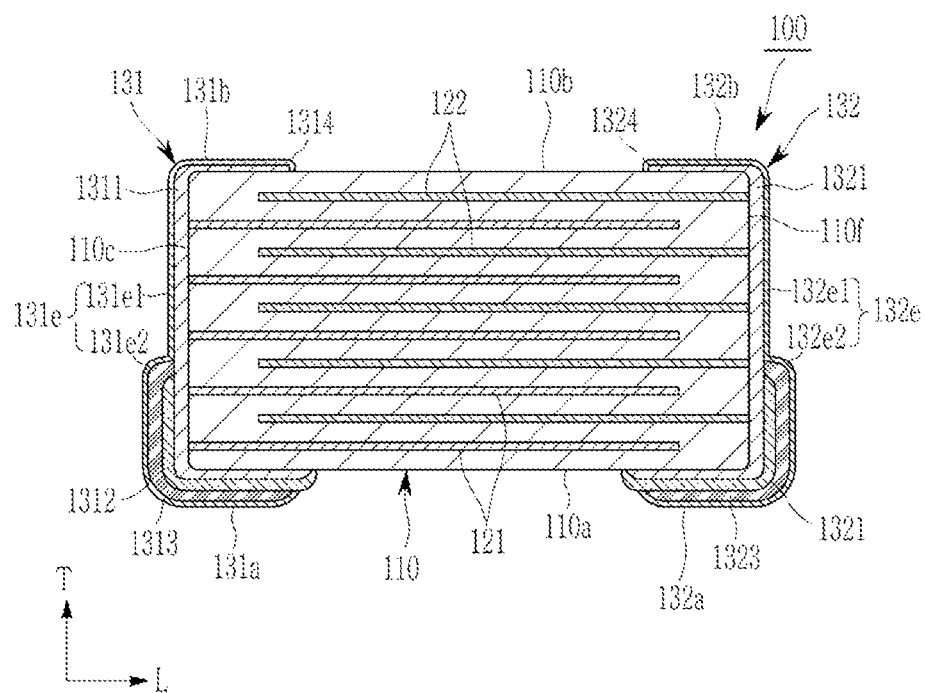
FIG. 8 is a cross-sectional view of a multilayered capacitor according to a modified example of one aspect.

FIG. 8 is a cross-sectional view of a multilayered capacitor 100 according to a modified example of one aspect.

In FIGS. 6 and 7, on the first surface 110a, the longitudinal direction length of the third layers 1313 and 1323 is greater than that of the second layers 1312 and 1322, respectively. Accordingly, on the first surface 110a, the third layers 1313 and 1323 may be disposed to completely cover the second layers 1312 and 1322.

On the other hand, FIG. 8 shows that on the first surface 110a, the longitudinal direction length of the second layers 1312 and 1322 may be greater than that of the third layers 1313 and 1323, respectively. Herein, on the first surface 110a, the second layers 1312 and 1322 are not completely covered with the third layers 1313 and 1323, respectively, and ends of the second layers 1312 and 1322 are exposed. When the second layers 1312 and 1322 include a conductive metal, the fourth layers 1314 and 1324 may be disposed on the second layers 1312 and 1322, but when the second layers 1312 and 1322 include no conductive metal or include it in a small amount, the fourth layers 1314 and 1324 are not disposed on the second layers 1312 and 1322, finally exposing the second layers 1312 and 1322. In other words, on the first surface 110a, the longitudinal direction length of the second layers 1312 and 1322 may be greater than or equal to that of the first layers 1311 and 1321, the longitudinal direction length of the third layers 1313 and 1323 may be less than that of the second layers 1312 and 1322, and the longitudinal direction length of the fourth layers 1314 and 1324 may be less than or equal to that of the second layers 1312 and 1322. Herein, since the first layers 1311 and 1321 are located at a place where stress is concentrated, when the board is bent, the bending strength may be additionally improved.

The first layers 1311 and 1321 may be sintered metal layers. The sintered metal layer may include a conductive metal and glass.

For example, the sintered metal layers may include a conductive metal such as copper (Cu), nickel (Ni), silver (Ag), palladium (Pd), gold (Au), platinum (Pt), tin (Sn), and tungsten (W), titanium (Ti), lead (Pb), an alloy thereof, or combinations thereof, and for example copper (Cu) may include a copper (Cu) alloy. When the conductive metal includes copper, the metal other than copper may be included in an amount of about 5 parts by mole or less based on 100 parts by mole of copper.

For example, the sintered metal layers may include a composition in which oxides are mixed with glass, and may include for example, at least one selected from the group consisting of silicon oxide, boron oxide, aluminum oxide, transition metal oxide, alkali metal oxide, and alkaline earth metal oxide. The transition metal may include at least one selected from the group consisting of zinc (Zn), titanium (Ti), copper (Cu), vanadium (V), manganese (Mn), iron (Fe), nickel (Ni), and mixtures thereof. The alkali metal may include at least one selected from the group consisting of lithium (Li), sodium (Na), potassium (K), and mixtures thereof. The alkaline-earth metal may include at least one selected from the group consisting of magnesium (Mg), calcium (Ca), strontium (Sr), barium (Ba) and mixtures thereof.

The contents of conductive metal and glass in the sintered metal layers is not particularly limited, but for example, in a cross-section cut in the longitudinal direction and stacking direction (cross-section in L-axis direction and T-axis direction) perpendicular to the width direction (W-axis direction) at the center (½) point in the width direction (W-axis direction) of the multilayered capacitor 100, an area ratio of the conductive metal may be about 30% to about 90%, or about 70% to about 90% relative to a total area of the sintered metal layers.

The second layers 1312 and 1322 or third layers 1313 and 1323 may be conductive resin layers.

The conductive resin layers include a resin and a conductive metal.

The resin included in the conductive resin layers is not particularly limited as long as it has bondability and impact absorption, and may be mixed with the powder of the conductive metal to form a paste. For example, the resin included in the conductive resin layers may include a phenol resin, an acrylic resin, a silicone resin, an epoxy resin, or a polyimide resin.

The conductive metal included in the conductive resin layers serves to be electrically connected to the first and second internal electrodes 121 and 122 or the sintered metal layers.

The conductive metal included in the conductive resin layers may have a spherical shape, a flake shape, or combinations thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) may be less than or equal to about 1.45. The flake-type powder means a powder having a flat and elongated shape, and is not particularly limited, but may have, for example, a length ratio between a major axis and a minor axis (long axis/short axis) of greater than or equal to about 1.95.

The conductive resin layers may include copper (Cu), silver (Ag), nickel (Ni), or mixtures thereof as the conductive metal. When the conductive resin layers include silver (Ag), since silver (Ag) dendrites may be formed on the surface of the multilayered capacitor 100 by ion migration, and thus, by using copper (Cu), an amount of noble metal used in the first and second external electrodes 131 and 132 may be minimized, thereby preventing or delaying an occurrence of ion migration.

On the other hand, in the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio (%) of the resin included in the second layers 1312 and 1322 may be different from that of the resin included in the third layers 1313 and 1323, respectively.

For example, in the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio (%) of the resin included in the second layers 1312 and 1322 may be different from that of the resin included in the third layers 1313 and 1323, respectively. In other words, a content of the resin included in the second layers 1312 and 1322 may be greater than that of the resin included in the third layers 1313 and 1323.

Herein, the area ratio of the resin included in the second layers 1312 and 1322 may be a percentage (%) of an area of the resin included in a unit area of the second layers 1312 and 1322 to the unit area of the second layers 1312 and 1322, and the area ratio of the resin included in the third layers 1313 and 1323 may be a percentage (%) of an area of the resin included in a unit area of the third layers 1313 and 1323 to the unit area of the third layers 1313 and 1323, respectively.

In addition, the area ratio of the resin included in the second layers 1312 and 1322 may be measured in the unit area of the second layers 1312 and 1322, wherein the unit area may for example, have a size of 10 µm×60 µm or 30 µm×60 µm in the cross-section photograph of SEM or STEM, etc. The unit area may be disposed at any position in the second layers 1312 and 1322 but must be entirely within the second layers 1312 and 1322. For example, on the third surface 110e, when the area ratio of the resin included in the second layer 1312 is measured, a long side of the unit area may be parallel to the thickness direction (T-axis direction), a short side of the unit area may be disposed parallel to the longitudinal direction (L-axis direction), on the fourth surface 110f, when the area ratio of the resin included in the second layer 1322 is measured, a long side of the unit area may be parallel to the thickness direction (T-axis direction), a short side of the unit area may be disposed parallel to the longitudinal direction (L-axis direction), and on the first surface 110a, when the area ratio of the resin included in the second layers 1312 and 1322 is measured, a long side of the unit area may be disposed parallel to the longitudinal direction (L-axis direction), and a short side of the unit area may be disposed parallel to the thickness direction (T-axis direction). Herein, the entire area of the second layers 1312 and 1322 is an entire area of the unit area, and the area of the resin included in the second layers 1312 and 1322 may be an area of the resin present within the unit area.

Similarly, the area ratio of the resin included in the third layers 1313 and 1323 may be measured in a unit area within the third layers 1313 and 1323, wherein the unit area may have, for example, a size of 10 µm×60 µm or 30 µm×60 µm in the cross-section photograph taken with SEM or STEM, etc. The unit area may be located at any position within the third layers 1313 and 1323 but must be entirely located within the third layers 1313 and 1323. For example, on the third surface 110e, when the area ratio of the resin included in the third layer 1313 is measured, a long side of the unit area may be parallel to the thickness direction (T-axis direction), and a short side of the unit area may be disposed parallel to the longitudinal direction (L-axis direction), on the fourth surface 110f, when the area ratio of the resin included in the third layer 1323 is measured, a long side of the unit area may be parallel to the thickness direction (T-axis direction), and a short side of the unit area may be disposed parallel to the longitudinal direction (L-axis direction), and on the first surface 110a, when the area ratio of the resin included in the third layers 1313 and 1323 is measured, a long side of the unit area may be parallel to the longitudinal direction (L-axis direction), and a short side of the unit area may be disposed parallel to the thickness direction (T-axis direction). Herein, the entire area of the third layers 1313 and 1323 may be an entire area of the unit area, and the area of the resin included in the third layers 1313 and 1323 may be an area of the resin present in the unit area.

A method of improving the bending strength of the multilayered capacitor 100 may include a method of relieving stress by improving a material of the first and second external electrodes 131 and 132 or a method of increasing a thickness of a conductive resin layer having a stress relieving function. The method of improving the material of the first and second external electrodes 131 and 132 may be realized by increasing a content of the resin in the conductive resin layer, but the resin content may be limited due to a side effect occurring when the resin content in the conductive resin layer increases. For example, when the resin content is increased, a content of a conductive metal is reduced, deteriorating the electrical connectivity of the multilayered capacitor 100, and in addition, plating defects may occur due to an increase in the resin content, resultantly deteriorating moisture resistance reliability.

Accordingly, the multilayered capacitor 100 according to the present disclosure includes a conductive resin layer only on the lower 4 surfaces of the multilayered capacitor 100, that is, the first surface 110a, the third surface 110e or the fourth surface 110f, the fifth surface 110c, and the sixth surface 110d, wherein the conductive resin layer is two conductive resin layers with different resin contents. Herein, since the lower 4 surfaces are regions receiving stress, when bent is a board on which the multilayered capacitor 100 is mounted, when a resin electrode is formed on the lower 4 surfaces, compared with when resin electrode is formed on the 5 surfaces, that is, the first surface 110a, the second surface 110b, the third surface 110e, or the fourth surface 110f, the fifth surface 110c, and the sixth surface 110d, a thickness of the conductive resin layer where the bending stress is concentrated may be increased.

In addition, the second layers 1312 and 1322 disposed on the outside of the first layers 1311 and 1321 may improve bonding strength of the first and second external electrodes 131 and 132 and the bending strength characteristics by increasing the resin content, and the third layers 1313 and 1323 contacting the fourth layers 1314 and 1324 solve the problem of plating defects by reducing the resin content, thereby improving the reliability of the multilayered capacitor 100.

Accordingly, the multilayered capacitor 100 according to the present disclosure may exhibit improved bending strength due to increased ductility of the first and second external electrodes 131 and 132 and thus may easily relieve stress relief, when a board is bent and in addition, may exhibit improved bonding strength of the first and second external electrodes 131 and 132 due to increased adhesive force of sintered metal layers with conductive resin layers of the first and second external electrodes 131 and 132, improved moisture resistance reliability due to dense formation of the plating layers of the first and second external electrodes 131 and 132, and improved electrical characteristics due to direct connection of the sintered metal layers and the plating layers.

For example, in the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio of the resin included in the second layers 1312 and 1322 may be about 60% to about 100%, for example, about 70% to about 90%. When the area ratio of the resin includes in the second layers 1312 and 1322 is less than about 60%, the bending strength improvement may be deteriorated. When the area ratio of the resin included in the second layers 1312 and 1322 is about 100%, the second layers 1312 and 1322 include no conductive metal.

In the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio of the conductive metal included in the second layers 1312 and 1322 may be about 0% to about 40%, for example, about 10% to about 30%. When the area ratio of the conductive metal included in the second layers 1312 and 1322 is greater than about 40%, the bending strength improvement may be deteriorated.

In addition, as the area ratio of the resin included in the second layers 1312 and 1322 is greater than or equal to about 60%, the area ratio of the conductive metal included in the second layers 1312 and 1322 may be smaller than an area ratio of the resin included in the second layers 1312 and 1322.

Optionally, the second layers 1312 and 1322 may further include a non-conductive filler.

The non-conductive filler may include silica, a glass-based oxide, or combinations thereof. The glass-based oxide may include, for example, at least one selected from silicon oxide, boron oxide, aluminum oxide, transition metal oxide, alkali metal oxide, and alkaline earth metal oxide. The transition metal may include one selected from the group consisting of zinc (Zn), titanium (Ti), copper (Cu), vanadium (V), manganese (Mn), iron (Fe) and nickel (Ni), the alkali metal may be selected from lithium (Li), sodium (Na), potassium (K), and mixtures thereof. The alkaline earth metal may include at least one selected from the group consisting of magnesium (Mg), calcium (Ca), strontium (Sr), barium (Ba), and mixtures thereof.

A content of the non-conductive filler in the second layers 1312 and 1322 is not particularly limited but for example, in the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio of the non-conductive filler may be about 0% to about 40% or about 10% to about 30% of a total area of the second layers 1312 and 1322. When the content of the non-conductive filler is greater than about 40%, the bending strength improvement may be deteriorated.

In addition, in the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio of the resin included in the third layers 1313 and 1323 may be about 8% to about 60%, for example, about 40% to about 60%. When the area ratio of the resin included in the third layers 1313 and 1323 is less than about 8%, since the resin and the conductive metal are not evenly mixed, it is difficult to prepare a paste. When the area ratio of the resin included in the third layers 1313 and 1323 is greater than about 60%, plating the fourth layers 1314 and 1324 on the third layers 1313 and 1323 may be peeled and produce an unplated region.

In the cross-section (L-axis direction and T-axis direction cross-section) of the multilayered capacitor 100 cut at the center (½ point) of the width direction (W-axis direction) in the longitudinal direction and the stacking direction perpendicular to the width direction (W-axis direction), an area ratio of the conductive metal included in the third layers 1313 and 1323 may be about 40% to about 92%, for example, about 40% to about 60%. Accordingly, the area ratio of the conductive metal included in the third layers 1313 and 1323 may be greater than the area ratio of the resin included in the third layers 1313 and 1323, respectively.

The fourth layers 1314 and 1324 may be plating layers. The plating layers may include at least one selected from the group consisting of nickel (Ni), copper (Cu), tin (Sn), palladium (Pd), platinum (Pt), gold (Au), silver (Ag), tungsten (W), titanium (Ti), lead (Pb), and alloys thereof. For example, the plating layers may include a nickel (Ni) plating layer or a tin (Sn) plating layer, and may have a form in which a nickel (Ni) plating layer and a tin (Sn) plating layer are sequentially stacked or a plating layer, a nickel (Ni) plating layer, and a tin (Sn) plating layer may be sequentially stacked. In addition, the plating layers may include a plurality of nickel (Ni) plating layers and/or a plurality of tin (Sn) plating layers.

The plating layers may improve mountability of the multilayered capacitor 100 with a board, structural reliability, external durability, heat resistance, and equivalent series resistance (ESR).

A method of manufacturing a multilayered capacitor according to some embodiments includes manufacturing a capacitor body including a dielectric layer and an internal electrode, and forming an external electrode outside the capacitor body.

First, the manufacturing of the capacitor body is described. In the manufacturing process of the capacitor body, a dielectric paste becomes the dielectric layer after firing, and a conductive paste becomes the internal electrode after firing.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is applied in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc., and barrel-polished by using a centrifugal barrel machine or the like after the solidification-drying. In the barrel polishing, the dielectric green sheet stack is put with a medium and a polishing liquid into a barrel container, and then, the barrel container is applied with rotational motion or vibration to polish unnecessary parts such as burrs and the like which are generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrode on the outer surfaces of the third and fourth surfaces, thereby improving the electrical connection of the first and second external electrodes and the first and second internal electrodes and easily forming the alloy portion.

Optionally, the first layer may be formed by coating a paste for forming a first layer on the outer surface of the obtained capacitor body and then sintering the paste.

The paste for forming the first layer may include a conductive metal and glass. The conductive metal and glass are the same as the ones described in the present disclosure and will not be repeatedly illustrated. In addition, the paste for forming the first layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the first layer on the outer surface of the capacitor body may include various printing methods such as a dip method, or screen printing, and the like, a coating method by using a dispenser, a spray method by using a spray, and the like. The paste for forming the first layer may be coated on at least the third and fourth surfaces of the capacitor body and optionally, on a portion of the first surface, the second surface, the fifth surface, or the sixth surface where the band portions of the first and second external electrodes are formed.

Thereafter, the capacitor body on which the paste for forming the first layer is coated is dried and sintered at a temperature of about 700° C. to about 1000° C. for about 0.1 hour to about 3 hours to form the first layer.

The second layer may be formed by coating a paste for forming the second layer on the outer surface of the resulting capacitor body and/or the first layer and then curing the paste.

The paste for forming the second layer may include a resin, and optionally a conductive metal or a non-conductive filler. The conductive metal and resin are the same as the ones described in the present disclosure and will not be repeatedly illustrated. The resin and conductive metal included in the second layer may be the same or different from the one included in the first layer. In addition, the paste for forming the second layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the second layer may include dipping the capacitor body 110 into the paste for the second layer including a resin and a conductive metal and curing it, screen-printing or gravure-printing the paste for the second layer on the surface of the capacitor body 110, or coating paste for the second layer and then curing it.

However, at this time, the paste for forming the second layer may be coated to cover a portion of the first layer and expose another portion. For example, the paste for forming the second layer is coated so that the second layer is not disposed on the second surface, but is disposed on the first surface, a portion of the third surface, a portion of the fifth surface, and a portion of the sixth surface.

Next, a third layer may be formed by coating a paste for forming a third layer on the second layer and then curing the paste.

The paste for forming the third layer may include a conductive metal and a resin. The conductive metal and resin are the same as the ones described in the present disclosure and will not be repeatedly illustrated. The resin and conductive metal included in the third layer may be the same or different from the one included in the first layer or the second layer. In addition, the paste for forming the third layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the third layer may include dipping the capacitor body 110 into the paste for the third layer including a resin and a conductive metal and curing it, screen-printing or gravure-printing the paste for the third layer on the surface of the capacitor body 110, or coating paste for the third layer and then curing it.

However, at this time, the paste for forming the third layer may be coated to cover the second layer. For example, the paste for forming the third layer is coated so that the third layer is not disposed on the second surface, but is disposed on the first surface, a portion of the third surface, a portion of the fifth surface, and a portion of the sixth surface.

In this case, a content of the resin included in the paste for forming the second layer may be greater than a content of the resin included in the paste for forming the third layer. Here, a content of the resin included in the paste for forming the second layer may be a percentage (%) of the volume of the resin relative to a total volume of the resin and the conductive metal in the paste for forming the second layer, and a content of the resin included in the paste for forming the third layer may be a percentage (%) of the volume of the resin relative to a total volume of the resin and the conductive metal in the paste for forming the third layer.

For example, in the paste for forming the second layer, a content of the resin relative to a total volume of the resin and the conductive metal may be about 100 vol % to about 60 vol %, for example about 70 vol % to about 90 vol %. When a content of the resin in the paste for forming the second layer is less than about 60 vol %, improvement in bending strength may be reduced.

In the paste for forming the second layer, a content of the conductive metal relative to a total volume of the resin and the conductive metal may be smaller than a content of the resin. For example, in the paste for forming the second layer, the content of the conductive metal may be 0 vol % to about 40 vol %, for example, about 10 vol % to about 30 vol %. When the content of the conductive metal in the paste for forming the second layer exceeds about 40 vol %, improvement in bending strength may deteriorate.

For example, in the paste for forming the third layer, a content of the resin relative to a total volume of the resin and the conductive metal may be about 60 vol % to about 8 vol %, for example, about 60 vol % to about 40 vol %. When the content of the resin in the paste for forming the third layer is greater than about 60 vol %, electrical connectivity may be deteriorated, and when it is less than about 8 vol %, moisture resistance may be deteriorated.

In the paste for forming the third layer, a content of the conductive metal relative to a total volume of the resin and the conductive metal may be greater than a content of the resin. For example, in the paste for forming the third layer, the content of the conductive metal may be about 92 vol % to about 40 vol %, for example about 40 vol % to about 60 vol %. When the content of the conductive metal in the paste for forming the third layer is less than about 40 vol %, electrical connectivity may be deteriorated, and when it exceeds 92 vol %, moisture resistance reliability may be deteriorated.

Next, a fourth layer is formed outside the third layer.

For example, the fourth layer may be formed by a plating method, or may be formed by sputtering or electroplating (electric deposition).

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
121: first internal electrode
122: second internal electrode
131: first external electrode
132: second external electrode
1311, 1321: first layer
1312, 1322: second layer
1313, 1323: third layer
1314, 1324: fourth layer
110*a*, 110*b*: first and second surfaces
110*e*, 110*f*: third and fourth surfaces
110*c*, 110*d*: fifth and sixth surfaces
131*a*, 132*a*: first electrode portion
131*b*, 132*b*: second electrode portion
131*c*, 132*c*: third electrode portion
131*e*, 132*e*: fourth electrode portion
131*c*1, 132*c*1: first region
131*c*2, 132*c*2: second region
131*e*1, 132*e*1: first region
131*e*2, 132*e*2: second region

What is claimed is:

1. A multilayered capacitor,
a capacitor body including a dielectric layer and an internal electrode, and
an external electrode disposed on outside surface the capacitor body,
wherein the external electrode includes
a first layer disposed on the capacitor body and connected to the internal electrode,
a second layer disposed on a portion of the first layer and exposing a remaining portion of the first layer, and including a first resin,
a third layer disposed on the second layer and including a second resin and a second conductive metal, and
a fourth layer disposed on the first and third layers,
the capacitor body has first and second surfaces facing each other in a stacking direction of the dielectric layer and the internal electrodes, third and fourth surfaces facing each other in a longitudinal direction, and fifth and sixth surfaces facing each other in a width direction,
in a cross-section cut in the longitudinal and thickness directions perpendicular to a width direction at a center in the width direction, an area ratio of the first resin included in the second layer is greater than an area ratio of the second resin included in the third layer,
wherein the second layer is not disposed on the second surface, and
the third layer is not disposed on the second surface.

2. The multilayered capacitor of claim 1, wherein
the first layer is disposed on the first, second, and third surfaces,
the second layer is disposed on the first and third surfaces or the first and fourth surfaces,
the third layer is disposed on the first and third surfaces or the first and fourth surfaces, and
the fourth layer is disposed on the first, second, and third surfaces.

3. The multilayered capacitor of claim 2, wherein
the first to fourth layers are disposed on the fifth and sixth surfaces.

4. The multilayered capacitor of claim 2, wherein
in a cross section cut in the longitudinal direction and the stacking direction perpendicular to the width direction at the center of the width direction of the multilayered capacitor,
on the third or fourth surface, a length of the second layer in the stacking direction is less than or equal to a length of the first layer in the stacking direction, and on the third or fourth surface, a length of the third layer in the stacking direction on the third or fourth surface is less than or equal to a length of the first layer in the stacking direction.

5. The multilayered capacitor of claim 2, wherein
in a cross section cut in the longitudinal direction and the stacking direction perpendicular to the width direction at the center of the width direction of the multilayered capacitor,
on the third or fourth surface, a length of the second layer in the stacking direction is about 95% or less relative to a length of the first layer in the stacking direction, and
on the third or fourth surface, a length of the third layer in the stacking direction is about 95% or less relative to a length of the first layer in the stacking direction.

6. The multilayered capacitor of claim 1, wherein
in a cross section cut in the longitudinal direction and the stacking direction perpendicular to the width direction at the center of the width direction of the multilayered capacitor,
on the third or fourth surface, a length of the third layer in the stacking direction is greater than or equal to a length of the second layer in the stacking direction.

7. The multilayered capacitor of claim 1, wherein
on the first surface, the second layer is disposed to completely cover the first layer, and
on the first surface, the third layer is disposed to completely cover the first layer.

8. The multilayered capacitor of claim 1, wherein
on the first surface, the third layer is disposed to completely cover the second layer.

9. The multilayered capacitor of claim 1, wherein the on the first surface, the third layer is disposed to partially expose the second layer without covering it completely.

10. The multilayered capacitor of claim 1, wherein
on the first surface, the second layer is disposed to completely cover the first layer,
on the first surface, the third layer is disposed to partially expose the second layer without covering it completely, and
on the first surface, the fourth layer is disposed to partially expose the second layer without covering it completely.

11. The multilayered capacitor of claim 1, wherein
the second layer further includes a non-conductive filler.

12. The multilayered capacitor of claim 11, wherein
the non-conductive filler includes silica, glass-based oxide, or a combination thereof.

13. The multilayered capacitor of claim 1, wherein
in a cross section cut in the longitudinal direction and the stacking direction perpendicular to the width direction at the center of the width direction of the multilayered capacitor,
an area ratio of the resin included in the second layer is about 60% to about 100% with respect to a total area of the second layer, and
an area ratio of the resin included in the third layer is about 8% to about 60% with respect to a total area of the third layer.

14. The multilayered capacitor of claim 1, wherein
the second layer further includes a first conductive metal or does not include a first conductive metal.

15. The multilayered capacitor of claim 14, wherein
in a cross section cut in the longitudinal direction and the stacking direction perpendicular to the width direction at the center of the width direction of the multilayered capacitor,
an area ratio of the first conductive metal included in the second layer is smaller than an area ratio of the first resin included in the second layer, and
an area ratio of the second conductive metal included in the third layer is greater than an area ratio of the second resin included in the third layer.

16. The multilayered capacitor of claim 1, wherein
in a cross section cut in the longitudinal direction and the stacking direction perpendicular to the width direction at the center of the width direction of the multilayered capacitor,
on the third or fourth surface, a maximum length of the second layer in the longitudinal direction is greater than or equal to about 3 μm.

17. A method of manufacturing a multilayered capacitor, comprising
manufacturing a capacitor body including a dielectric layer and an internal electrode, and
forming an external electrode disposed on outside surface of the capacitor body,
wherein the forming of the external electrode includes
forming a first layer disposed on the outside surface of the capacitor body,
coating a paste for forming a second layer including a first resin and a first conductive metal to cover a portion of the first layer and expose a remaining portion of the first layer to form the second layer,
coating a paste for forming a third layer including a second resin and a second conductive metal so as to cover the second layer to form the third layer, and
forming a fourth layer covering the first and third layers,
wherein a content of the first resin included in the paste for forming the second layer is greater than a content of the second resin included in the paste for forming the third layer.

18. The method of claim 17, wherein
in the paste for forming the second layer, a content of the first resin relative to a total volume of the first resin and the first conductive metal is about 100 vol % to about 160 vol %, and
in the paste for forming the third layer, a content of the second resin relative to a total volume of the second resin and the second conductive metal is about 60 vol % to about 8 vol %.

19. The method of claim 17, wherein
in the paste for forming the second layer, vol % of the first conductive metal relative to a total volume of the first resin and the first conductive metal is less than vol % of the first resin, and
in the paste for forming the third layer, vol % of the first conductive metal relative to a total volume of the second resin and the second conductive metal is greater than vol % of the second resin.

20. A multilayered capacitor,
a capacitor body including a dielectric layer and an internal electrode, and having first and second surfaces facing each other in a stacking direction of the dielectric layer and the internal electrodes, third and fourth surfaces facing each other in a longitudinal direction, and fifth and sixth surfaces facing each other in a width direction,
an external electrode disposed on outside surface the capacitor body,
wherein the external electrode includes
a first layer disposed on the first, the second, and the third surfaces, and connected to the internal electrode, a second layer disposed on a portion of the first layer and exposing a remaining portion of the first layer, and including a first resin, and also disposed on the third surfaces or the first and fourth surfaces, a third layer disposed on the second layer on the first and third surfaces or on the first and fourth surfaces, and a fourth layer disposed on the third layer on the first, second, and third surfaces, wherein on the first surface, the third layer is disposed on the second layer to completely cover the second layer.

21. The multilayered capacitor of claim 20, wherein the on the first surface, the third layer is disposed on the second layer to partially expose the second layer without covering it completely.

22. The multilayered capacitor of claim 20, wherein the second layer includes a first resin, the third layer includes a second resin, and in a cross-section cut in the longitudinal and thickness directions perpendicular to a width direction at a center in the width direction, an area ratio of the first resin included in the second layer is greater than an area ratio of the second resin included in the third layer.

23. The multilayered capacitor of claim 20, wherein the second layer further include a conductive metal, and in a cross section cut in the longitudinal direction and the stacking direction perpendicular to the width direction at the center of the width direction of the multilayered capacitor, an area ratio of the conductive metal included in the second layer is smaller than an area ratio of the first resin included in the second layer.

24. The multilayered capacitor of claim 20, wherein the third layer further include a conductive metal, and in a cross section cut in the longitudinal direction and the stacking direction perpendicular to the width direction at the center of the width direction of the multilayered capacitor, an area ratio of the conductive metal included in the third layer is greater than an area ratio of the second resin included in the third layer.

\* \* \* \* \*